United States Patent
Lee

(10) Patent No.: US 10,452,388 B2
(45) Date of Patent: Oct. 22, 2019

(54) METHOD FOR UPDATING SOFTWARE FOR VEHICLE AND THE VEHICLE USING OF THE SAME

(71) Applicants: Hyundai Motor Company, Seoul (KR); Kia Motors Corporation, Seoul (KR)

(72) Inventor: Chang Byung Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/983,473

(22) Filed: May 18, 2018

(65) Prior Publication Data
US 2019/0187976 A1 Jun. 20, 2019

(30) Foreign Application Priority Data
Dec. 20, 2017 (KR) .................. 10-2017-0175611

(51) Int. Cl.
| | | |
|---|---|---|
| *G06F 8/658* | (2018.01) | |
| *H04W 4/44* | (2018.01) | |
| *G07C 5/00* | (2006.01) | |
| *H04W 4/46* | (2018.01) | |
| *G06F 16/29* | (2019.01) | |

(52) U.S. Cl.
CPC .............. *G06F 8/658* (2018.02); *G06F 16/29* (2019.01); *G07C 5/008* (2013.01); *H04W 4/44* (2018.02); *H04W 4/46* (2018.02)

(58) Field of Classification Search
CPC .......... G06F 8/658; G06F 16/29; H04W 4/46; H04W 4/44; G07C 5/008
See application file for complete search history.

(56) References Cited

U.S. PATENT DOCUMENTS

| | | | |
|---|---|---|---|
| 9,299,256 B2 | 3/2016 | Chen et al. | |
| 2013/0325565 A1 | 12/2013 | Toussaint | |
| 2014/0306834 A1* | 10/2014 | Ricci ................. | B60Q 1/00 340/902 |
| 2016/0259637 A1* | 9/2016 | Kumar .................. | G06F 8/65 |

FOREIGN PATENT DOCUMENTS

| | | |
|---|---|---|
| JP | 2009-069059 A | 4/2009 |
| JP | 2011-065279 A | 3/2011 |
| JP | 2016-014938 A | 1/2016 |
| KR | 10-2010-0072781 A | 7/2010 |
| KR | 10-2014-0053724 A | 5/2014 |

* cited by examiner

*Primary Examiner* — Wei Y Zhen
*Assistant Examiner* — Amir Soltanzadeh
(74) *Attorney, Agent, or Firm* — Morgan, Lewis & Bockius LLP

(57) ABSTRACT

A method for updating software for a vehicle by receiving difference information from an external device in a certain space, and the vehicle to which the method is applied are provided, may include determining whether necessary difference map data of the vehicle is present based on information received from a parking lot server in a limited space such as a parking lot, and receiving necessary difference information related to map data of the vehicle from a vehicle in which the difference information is stored.

11 Claims, 8 Drawing Sheets

FIG. 6

| PARKING POSITION INFORMATION | PARKING TIME INFORMATION | DIFFERENCE VERSION INFORMATION | INFORMATION FOR COMMUNICATION (IP ADDRESS ETC.) | VEHICLE INFORMATION (VEHICLE ID) |
|---|---|---|---|---|
| 1 | 13:20 | V20190201<br>V20190201<br>V20190301 | XXX.XXX.XXX.XXX | ID_1 |
| ... | ... | ... | ... | ... |
| 13 | 10:05 | V20190201<br>V20190202<br>V20190302<br>V20190401 | XXX.XXX.XXX.XXX | ID_13 |
| 14 | 14:15 | V20190101<br>V20190102 | XXX.XXX.XXX.XXX | ID_14 |
| ... | ... | ... | ... | ... |

< EXAMPLE OF INFORMATION EXCHANGED BETWEEN SERVER AND VEHICLE >

FIG. 9

| PARKING POSITION INFORMATION (E.G., PARKING SPACE ID) | PARKING TIME INFORMATION | DIFFERENCE VERSION INFORMATION | INFORMATION FOR COMMUNICATION (IP ADDRESS ETC.) | INFORMATION RECEPTION TIME |
|---|---|---|---|---|
| 1 | 13:20 | V20190201<br>V20190201<br>V20190301 | XXX.XXX.XXX.XXX | 23:20 |

| PARKING POSITION INFORMATION (E.G., PARKING SPACE ID) | PARKING TIME INFORMATION | DIFFERENCE VERSION INFORMATION | INFORMATION FOR COMMUNICATION (IP ADDRESS ETC.) | INFORMATION RECEPTION TIME |
|---|---|---|---|---|
| 1 | 13:20 | V20190201<br>V20190201<br>V20190301 | XXX.XXX.XXX.XXX | 23:20 |
| 14 | 14:15 | V20190101<br>V20190102 | XXX.XXX.XXX.XXX | 24:15 |

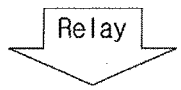
Relay

| PARKING POSITION INFORMATION (E.G., PARKING SPACE ID) | PARKING TIME INFORMATION | DIFFERENCE VERSION INFORMATION | INFORMATION FOR COMMUNICATION (IP ADDRESS ETC.) | INFORMATION RECEPTION TIME |
|---|---|---|---|---|
| 1 | 13:20 | V20190201<br>V20190201<br>V20190301 | XXX.XXX.XXX.XXX | 23:20 |
| ... | ... | ... | ... | ... |
| 13 | 10:05 | V20190201<br>V20190202<br>V20190302<br>V20190401 | XXX.XXX.XXX.XXX | 20:05 |
| 14 | 14:15 | V20190101<br>V20190102 | XXX.XXX.XXX.XXX | 24:15 |
| ... | ... | ... | ... | ... |

METHOD FOR UPDATING SOFTWARE FOR VEHICLE AND THE VEHICLE USING OF THE SAME

CROSS-REFERENCE TO RELATED APPLICATION(S)

The present application claims priority to Korean Patent Application No. 10-2017-0175611, filed on Dec. 20, 2017, the entire contents of which is incorporated herein for all purposes by this reference.

BACKGROUND OF THE INVENTION

Field of the Invention

The present invention relates to a method for updating software for a vehicle and the vehicle using the same, more, to a method for updating map data for a vehicle and the vehicle to which the method is applied.

Description of Related Art

A variety of vehicle safety devices have been developed and mounted to a vehicle in consideration with the driver's convenience and safety. The vehicle safety device may include a safety auxiliary device such as a lane departure warning system configured to prevent a vehicle from deviating from a driving lane by helping the steering wheel operation of the driver when the vehicle is driven on the road, and an additional service device such as a navigation system configured to guide a route to a destination, and information related to the vicinity of the route to the destination that is selected by a driver.

Since the navigation system provides a route from a departure to a destination based on map data, update state of the map data determines the reliability of the route information.

On the other hand, since the road information displayed on the map data is partially changed, the navigation system stores the map data, which is partially updated, for each version. That is, the map data, which is partially updated and stored in the navigation system, is in a fragmented state. This may cause the reduction of loading speed of the map data in a process of providing the route guidance service.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for updating software for a vehicle by receiving difference information from an external device in a certain space, and the vehicle to which the method is applied. Various aspects of the present invention are directed to providing a method for updating software for a vehicle by determining whether necessary difference map data of the vehicle is present based on information received from a parking lot server in a limited space such as a parking lot, and by receiving necessary difference information related to map data of the vehicle from a vehicle in which the necessary difference information is stored, and the vehicle to which the method is applied.

Various aspects of the present invention are directed to providing a method for updating software for a vehicle while performing parking a vehicle, by receiving difference information and position information related to an available parking space from an external device in a certain space, and the vehicle to which the method is applied.

Additional various aspects of the present invention will be set forth in portion in the description which follows and, in part, will be obvious from the description, or may be learned by practice of the present invention.

According to various aspects of the present invention, a method for updating software for a vehicle may include receiving vehicle information and difference version information related to other vehicle from a server; identifying whether necessary difference version information is present or not based on the received difference version information and identifying vehicle information related to other vehicle having the necessary difference version information; receiving the necessary difference version information from the other vehicle having the necessary difference version information; and updating software for the vehicle based on the received necessary difference version information.

The reception of the vehicle information and difference version information related to other vehicle from the server may include receiving vehicle information, difference version information, parking time information, and parking position information related to the other vehicle parking in a certain space, from the server.

The method may further include when a plurality of other vehicles has the necessary difference version information, arranging the other vehicles with respect to a vehicle recently parking, based on the parking time information; identifying whether an available parking space is present in the vicinity of the other vehicle, in the order of arrangement based on the parking position information; and driving to the available parking space and parking in the available parking space.

When a plurality of pieces of necessary difference version information is present and different other vehicles have the necessary difference version information, the reception of the necessary difference version information from the other vehicle having the necessary difference version information may include receiving first necessary difference version information from a first vehicle; and receiving second necessary difference version information from a second vehicle.

In the reception of the vehicle information and difference version information related to other vehicle from the server, the difference version information may include difference version information related to software for the vehicle including at least one of map information, system software, firmware, and an application.

The method may further include transmitting the received necessary difference version information and vehicle information related to the vehicle to the server.

The method may further include transmitting vehicle information and difference version information related to a vehicle to the server; and receiving vehicle information related to other vehicle having the necessary difference version information related to the vehicle from the server.

The method may further include receiving the vehicle information and difference version information related to the vehicle from the server and obtaining vehicle information related to other vehicle having the necessary difference version information related to the vehicle and transmitting the obtained information to the vehicle.

According to various aspects of the present invention, a vehicle may include a communicator configured to receive vehicle information and difference version information related to other vehicle from a server; and a controller configured to identify whether necessary difference version information is present or not based on the received difference version information and configured to identify vehicle information related to other vehicle having the necessary difference version information, and configured to allow software for a vehicle to be updated by receiving the necessary difference version information from the other vehicle having the necessary difference version information.

The communicator may receive vehicle information, difference version information, parking time information, and parking position information related to the other vehicle parking in a certain space, from the server.

When a plurality of other vehicles has the necessary difference version information, the controller may arrange the other vehicles with respect to a vehicle recently parking, based on the parking time information, identify whether an available parking space is present in the vicinity of the other vehicle, in the order of arrangement based on the parking position information; and allow the vehicle to drive toward the available parking space and to park in the available parking space.

When a plurality of pieces of necessary difference version information is present and different other vehicles have the necessary difference version information, the controller may allow the vehicle to receive first necessary difference version information from a first vehicle and allows the vehicle to receive second necessary difference version information from a second vehicle.

The difference version information may include difference version information related to software for the vehicle including at least one of map information, system software, firmware, and an application.

The controller may be configured to control the communicator so that the communicator transmits the received necessary difference version information and vehicle information related to the vehicle to the server.

The controller may be configured to control the communicator so that the communicator transmits the vehicle information and difference version information related to the vehicle to the server and receives the vehicle information related to other vehicle having the necessary difference version information related to the vehicle from the server.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a table illustrating information exchanged between the server and the vehicle.

FIG. 9 is a table illustrating a case in which difference version information received from other vehicle is added in a relay manner.

Figure 1:
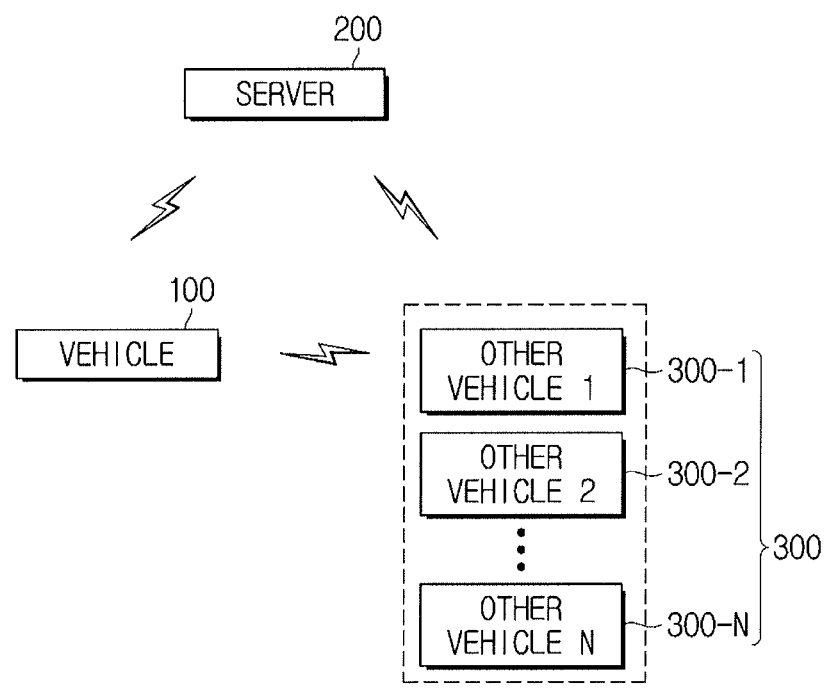
FIG. 1 is a block diagram illustrating a software upgrade system of a vehicle according an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection may include "connection via a wireless communication network".

Further, when a portion "includes" or "comprises" an element, unless there is a description contrary thereto, the portion may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made more specifically to embodiments of the present invention, examples of which are illustrated in the accompanying drawings.

FIG. 1 is a block diagram illustrating a software upgrade system of a vehicle according an exemplary embodiment of the present invention.

Referring to FIG. 1, according to an exemplary embodiment of the present invention, a software upgrade system of a vehicle may include a vehicle 100, a server 200 and other vehicles 300 (300-1, 300-2, . . . , 300-N, N is an integer of 3 or more).

According to embodiments, it may be possible to upgrade software version information related to a vehicle 100 in a certain space S. For example, various aspects of the present invention are directed to providing a software upgrade system of the vehicle 100 configured to allow the vehicle 100 to be easily park while allowing the vehicle 100 to receive difference version information which is necessary to upgrade software from other vehicle 300 in a certain space S such as a parking lot. Hereinafter for convenience of description, a description will be described with an example in which a certain space S is a parking lot, but is not limited thereto.

According to embodiments, the vehicle 100 may include an autonomous vehicle. Embodiments may provide a method for allowing an autonomous to determine a driving route while effectively updating software version information, in a process of determining a driving route after the autonomous vehicle enters a parking lot.

Hereinafter difference version information necessary for upgrading software may represent difference version information for upgrading at least one software, wherein the software is to provide a navigation service of the vehicle 100 and may include map information, system software, firmware, and an application. Furthermore, difference version information necessary for upgrading software may be referred as "necessary difference information".

In the following description, the vehicle 100 may represent a vehicle entering the parking lot, a server 200 may represent a parking lot server, and other vehicle 300 may represent a plurality of vehicles 300 (300-1, 300-2, . . . , 300-N, N is an integer of 3 or more) parking in the parking lot. According to embodiments, when the vehicle 100 enters the parking lot, and parking of the vehicle 100 is completed, the vehicle 100 may function as the other vehicle 300 with respect to a vehicle 100 which newly enters the parking lot.

The vehicle 100 may try to communicate with the server 200 upon entering the parking lot, and the vehicle 100 may identify information related to the other vehicle 300 having difference version information, which is needed for upgrading software of the vehicle 100, by receiving vehicle information and difference version information related to the other vehicle 300 from the server 200. According to embodiments, the vehicle 100 may transmit vehicle information and difference version information related to the vehicle 100, to the server 200 and receive information related to the other vehicle 300 having necessary difference version information, which is needed for upgrading software of the vehicle 100, from the server 200. By use of a method in which the information related to the other vehicle 300 is received from the server 200, it may be possible to reduce an amount of information processed in the vehicle 100 and thus it may be possible to easily obtain the information related to the other vehicle 300 having necessary difference information.

A method in which the vehicle 100 becomes a subject and identifies information related to the other vehicle 300 having necessary difference information is as follows.

The vehicle 100 may try to communicate with the server 200 upon entering the parking lot and receive vehicle information and difference version information related to the other vehicle 300 from the server 200. The vehicle 100 may identify whether difference version information is present or not, based on the received difference version information, and identify vehicle information related to the other vehicle 300 having the necessary difference version information. The vehicle 100 may move to the vicinity of the other vehicle 300 to receive the necessary difference version information. According to embodiments, the vehicle 100 may receive an available parking position from the server 200, wherein the vehicle 100 may receive the necessary difference version information from the other vehicle 300 while parking in the vicinity of the other vehicle 300.

When a plurality of other vehicles 300 (a first vehicle and a second vehicle) has the necessary difference version information, the vehicle 100 may move to the vicinity of a first vehicle and then receive first necessary difference version information from the first vehicle. Sequentially, the vehicle 100 may move to the vicinity of a second vehicle and then receive second necessary difference version information from the second vehicle.

A method in which the server 200 becomes a subject and identifies information related to the other vehicle 300 having necessary difference information and transmits information related to the other vehicle 300 to the vehicle is as follows.

The vehicle 100 may try to communicate with the server 200 upon entering the parking lot and transmit vehicle information and difference version information related to the vehicle 100 to the server 200. In the instant case, the server 200 may determine whether the vehicle 100 needs to upgrade difference version information based on the information and the difference version information related to the other vehicle 300, which was received from the other vehicle 300 and stored in the server 200, and based on the information related to the difference version information related to the vehicle 100, which is received from the vehicle 100. When it is determined that the vehicle 100 needs to upgrade the difference version information, the server 200 may transmit the information related to the other vehicle 300 having the difference version information, which is needed for upgrading the vehicle 100, to the vehicle 100. When the vehicle 100 receives the information related to the other vehicle 300 from the server 200, the vehicle 100 may move to the vicinity the other vehicle 300 to receive the necessary difference version information from the other vehicle 300. According to embodiments, the vehicle 100 may receive an available parking position from the server 200, wherein the vehicle 100 may receive the necessary difference version information from the other vehicle 300 while parking in the vicinity of the other vehicle 300.

When a plurality of other vehicles 300 (a first vehicle and a second vehicle) has the necessary difference version information, the vehicle 100 may move to the vicinity of a first vehicle and then receive first necessary difference version information from the first vehicle. Sequentially, the vehicle 100 may move to the vicinity of a second vehicle and then receive second necessary difference version information from the second vehicle.

Hereinafter, a control configuration of the vehicle and the server 200 for providing the software update system of the vehicle according to embodiments will be described in more detail.

Figure 2:
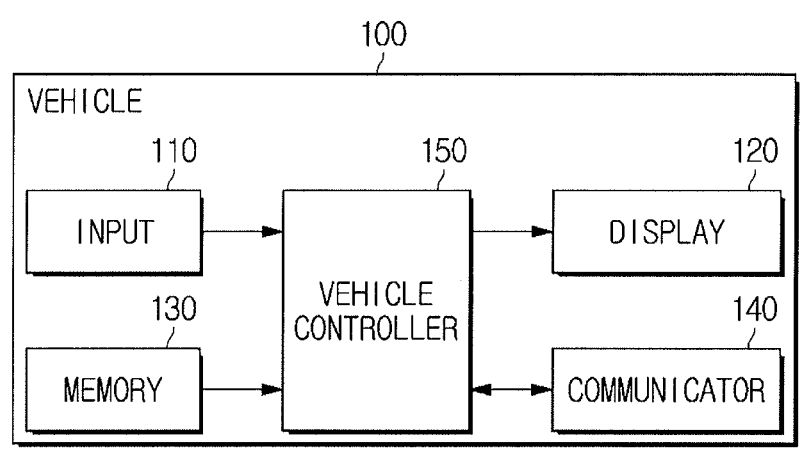
FIG. 2 is a control block diagram illustrating the vehicle according to an exemplary embodiment of the present invention.

FIG. 2 is a control block diagram illustrating the vehicle according to an exemplary embodiment of the present invention.

Referring to FIG. 2, according to an exemplary embodiment of the present invention, the vehicle 100 may include an input 110, a display 120, a memory 130, a communicator 140 and a vehicle controller 150.

The input 110 may receive an operation command for the vehicle 100 from a user. For example, the input 110 may receive various operation commands for operating the vehicle 100 from the user.

The input 110 may include various operation buttons provided in the vehicle 100, and according to embodiments, the vehicle 100 may include software type devices, e.g., Graphical User interface (GUI) such as a touch pad. The touch pad may be implemented by Touch Screen Panel (TSP) and thus the touch pad may have a layer structure with the display 120 described later.

The display 120 may display operation information on various functions provided in the vehicle 100. The display 120 may be a concept including a display of the AVN device provided in the vehicle 100 or alternatively a concept including a display disposed in a rear surface of a driver seat or a passenger seat, separated from the AVN device.

The display 120 may display the map information for providing the navigation service, and may display the updated map information when the map information is updated according to an exemplary embodiment of the present invention. Furthermore, when the update of the software of the vehicle including the map information is needed, the display 120 may display that the update of the software of the vehicle is needed, and the display 120 may display a progress screen to indicate a progress of the update during the software is updated. When the update is completed, the display 120 may display that the update is completed.

The display 120 may be implemented by Cathode Ray Tube (CRT), Digital Light Processing (DLP) panel, Plasma Display Penal, Liquid Crystal Display (LCD) panel, Electro Luminescence (EL) panel, Electrophoretic Display (EPD) panel, Electrochromic Display (ECD) panel, Light Emitting Diode (LED) panel or Organic Light Emitting Diode (OLED) panel. The implementation of the display is not limited thereto.

The memory 130 may store various data (including map information for providing a navigation service), system software, firmware, or an application for controlling various functions provided in the vehicle 100 under the control of the vehicle controller 150. Furthermore, the memory 130 may store the software difference version information related to the vehicle 100 described above. For example, the memory 130 may store an application and map information for providing a navigation service in a vehicle, and store difference version information for map information which is updated as time passes.

The memory 130 may store a control program for receiving the necessary difference version information from the other vehicles 300 parking in a certain space S when the vehicle 100 enters the certain space S.

The memory 130 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the memory 130 is not limited thereto. The memory 130 may be a memory which is implemented by a separate memory chip from the aforementioned processor related to the controller or the memory 130 may be implemented by a single chip with a processor.

The communicator 140 may include one or more components configured to allow the communication with an external device, wherein the communicator 140 may include at least one of a short range communication module, a wired communication module, and a wireless communication module.

The communicator 140 may be configured to request necessary information to the server 200 after trying the communication with the server 200, and the communicator 140 may be configured to receive vehicle information, difference version information, parking time information and parking position information related to the other vehicle 300, and information for the communication with the other vehicle 300, from the server 200, wherein the other vehicle 300 parks in the certain space S.

Furthermore, the communicator 140 may be configured to request necessary information to the other vehicle 300 after trying the communication with the other vehicle 300 provided in the certain space S, and configured to receive necessary difference information stored in the other vehicle 300, from the other vehicle 300.

According to embodiments, the communicator 140 may be configured to transmit the vehicle information, difference version information, and information for the communication of the vehicle 100, and configured to receive vehicle information related to the other vehicle 300 having the necessary difference version information, from the server 200. According to embodiments, the communicator 140 may be configured to receive information related to parking position in vicinity of the other vehicle 300.

The short-range communication module may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module may include a variety of wired communication module, e.g., Controller Area Network (CAN) communication module, Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), or plain old telephone service (POTS).

The wireless communication module may include a wireless communication module supporting a variety of wireless communication methods, e.g., Radio Data System-Traffic Message Channel (RDS-TMC), Digital Multimedia Broadcasting (DMB), Wifi module, Wireless broadband module, global System for Mobile (GSM) Communication, Code Division Multiple Access (CDMA), Wideband Code Division Multiple Access (WCDMA), Time Division Multiple Access (TDMA), and Long Term Evolution (LTE).

The vehicle controller 150 may control the overall operation of the vehicle 100. The vehicle controller 150 may control components of the vehicle 100 such as the input 110, the display 120, the memory 130, and the communicator 140. The vehicle controller 150 may include various processors including at least one chip on which an integrated circuit is formed.

The vehicle controller 150 may be implemented using a memory storing an algorithm for controlling an operation of components in the vehicle and data related to programs implementing the algorithm, and a processor or performing the above mentioned operation using the data stored in the memory. The memory and the processor may be implemented in separate chips, or a single chip.

The vehicle controller 150 may receive the vehicle information, the difference version information, the parking time information, the parking position information related to the other vehicle 300 and the information for the communication of the other vehicle 300 from the server via the communicator 140, identify whether necessary difference version information is present or not based on the received information, identify the vehicle information related to the other vehicle 300 having the necessary difference version information, move to the vicinity the other vehicle 300 to receive the necessary difference version information from the other vehicle 300 having the necessary difference version information, and receive the necessary difference version information from the other vehicle 300. The vehicle controller 150 may upgrade the software of the vehicle based on the received necessary difference version information.

The vehicle controller 150 may arrange the other vehicles 300 in the order of the vehicles that recently parks, based on the parking time information related to the other vehicle 300 when a plurality of other vehicles 300 has the necessary difference version information. The vehicle controller 150 may identify whether an available parking space is present in the vicinity of the other vehicle 300, in the order of arrangement, based on parking position information related to the other vehicle 300, and move to the available parking space and park in the available parking space while receiving the necessary difference version information from the other vehicle 300. The vehicle controller 150 may upgrade the software of the vehicle based on the received necessary difference version information.

When a plurality of pieces of necessary difference version information is present and different other vehicles have the necessary difference version information, the vehicle controller 150 may move to the vicinity the first vehicle to receive first necessary difference information from the first vehicle and then receive the first necessary difference information from the first vehicle. Sequentially, the vehicle controller 150 may move to the vicinity the second vehicle to receive second necessary difference information from the second vehicle and then receive the second necessary difference information from the second vehicle.

When the vehicle 100 enters the certain space S, the vehicle controller 150 may control the communicator 140 so that the communicator 140 transmits the vehicle information, the difference version information related to the vehicle 100 and the information for the communication of the vehicle 100 to the server 200. The vehicle controller 150 may control the communicator 140 so that the communicator 140 receives the vehicle information related to the other vehicle 300 having the necessary difference version information from the server 200. The server 200 described later may store the vehicle information, the difference version information, the parking position information, the parking time information related to the other vehicle 300 and the information for the communication of the other vehicles 300 parking in the certain space S. When the server 200 receives the vehicle information, the difference version information related to the vehicle 100 and the information for the communication of the vehicle 100, from the vehicle 100 parking in the certain space S, the server 200 may identify necessary difference version information related to the vehicle 100 based the information pre-stored in the server 200, identify the vehicle information related to the other vehicle 300 having the necessary difference version information, and transmit the vehicle information related to the other vehicle 300 to the vehicle 100. A description thereof will be described with reference a related portion.

Figure 3:
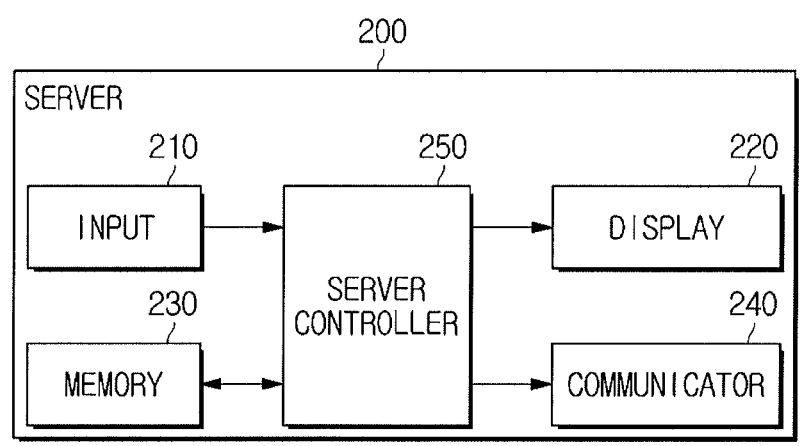
FIG. 3 is a control block diagram illustrating the server 200 according to an exemplary embodiment of the present invention.

FIG. 3 is a control block diagram illustrating the server 200 according to an exemplary embodiment of the present invention.

Referring to FIG. 3, according to an exemplary embodiment of the present invention, the server 200 may include an input 210, a display 220, a memory 230, a communicator 240 and a server controller 250.

The input 210 may receive an operation command for the server 200 from a user. For example, the input 210 may receive various operation commands for operating the server 200 including a power on/off command of the server 200, from the user.

The input 210 may include various operation buttons provided in the server 200, and according to embodiments, the input 210 may include software type devices, e.g., Graphical User interface (GUI) such as a touch pad. The touch pad may be implemented by Touch Screen Panel (TSP) and thus the touch pad may have a layer structure with the display 220.

The display 220 may display operation information on various functions provided in the server 200. The display 220 may display a power-off state of the server 200, operation mode information related to the server 200, information related a process, which is currently processed in the server 200, and a progress rate of the process. A description of the type of the display 220 the same as the description of the display 120 of the vehicle 100 will be omitted.

The memory 230 may store various data, programs or applications for controlling various functions provided in the server 200 under the control of the server controller 250. Furthermore, the memory 230 may store the vehicle information, the difference version information, the parking time information, the parking position information related to the other vehicle 300 parking in the certain space S and the information for the communication of the other vehicle 300, and store a parking management program for providing a parking management service for the certain space S. Furthermore, the memory 230 may store a request signal for the information related to the other vehicle 300, which is transmitted from the vehicle 100 entering the certain space S to the server 200, and obtain necessary difference information which is needed to update the software of the vehicle 100, based on the request signal. The memory 230 may store a program for transmitting the necessary difference information to the vehicle 100.

The memory 230 may receive the vehicle information and the difference version information related to the vehicle from the vehicle 100 and store the vehicle information and the difference version information. The memory 230 may obtain the vehicle information related to the other vehicle 300 having the necessary difference information, based on the corresponding information, and store a control program for transmitting the obtained information to the vehicle 100.

A description of the type of the memory 230 the same as or substantially the same as the description of the memory 130 of the vehicle 100 will be omitted.

The communicator 240 may include one or more components configured to allow the communication with an external device, wherein the communicator 240 may include at least one of a short range communication module, a wired communication module, and a wireless communication module.

The communicator 240 may be configured to receive the vehicle information, the difference version information, the parking time information and the parking position information related to the other vehicle 300, and information for the communication with the other vehicle 300, from the other vehicle 300, wherein the other vehicle 300 parks in the certain space S. Furthermore, the communicator 240 may be configured to receive a request signal for the information related to the other vehicle 300, wherein the request signal is transmitted from the vehicle 100 entering the certain space S, to the server 200. The communicator 240 may be configured to transmit the information related to the other vehicle 300, which is obtained from the server controller 250, to the vehicle 100. According to embodiments, the communicator 240 may transmit parking position information provided from the server controller 250. The communicator 240 may be configured to receive the vehicle information, the difference version information, the parking time information, the parking position information and the information for the communication, from the vehicle 100, when the vehicle 100 parks after receiving the necessary difference version information based on the information related to the other vehicle 300.

The communicator 240 may be configured to receive the vehicle information and the difference version information related to the vehicle 100 from the vehicle 100. When the server controller 250 obtains the vehicle information related to the other vehicle 300 having the necessary difference information related to the vehicle 100, based on the vehicle information and the difference version information, which is received from the vehicle 100, the communicator 240 may transmit the obtained information to the vehicle 100.

A description of the type of the communicator 240 the same as or substantially the same as the description of the communicator 140 of the vehicle 100 will be omitted.

The server controller 250 may control the overall operation of the server 200. The server controller 250 may control components of the server 200 such as the input 210, the display 220, the memory 230, and the communicator 240. The server controller 250 may include various processors including at least one chip on which an integrated circuit is formed.

The server controller 250 may be implemented using a memory (not shown) storing an algorithm for controlling an operation of components in the vehicle and data related to programs implementing the algorithm, and a processor (not shown) performing the above mentioned operation using the data stored in the memory. The memory and the processor may be implemented in separate chips, or a single chip.

The server controller 250 may receive the vehicle information, the difference version information, the parking time information, the parking position information related to the other vehicles 300 and the information for the communication of the other vehicle 300, from the other vehicle 300, which enters the certain space S and parks in the certain space S, and store the received information in the memory 230.

When the server controller 250 receives a request signal for the information related to the other vehicle 300 from the vehicle 100 that enters the certain space S, the server controller 250 may transmit the vehicle information, the difference version information, the parking time information, the parking position information related to the other vehicles 300 and the information for the communication of the other vehicle 300, to the vehicle 100.

When the vehicle 100 parks after receiving the necessary difference information from the other vehicle 300 based on the received information, the server controller 250 may receive the vehicle information, the difference version information, the parking time information, the parking position information related to the vehicle 100 and the information for the communication of the vehicle 100, and allow the memory 230 to store the corresponding information.

Meanwhile, the server controller 250 may receive the vehicle information, the difference version information, and the information for the communication of the vehicle 100, from a vehicle entering the certain space S, and store the received information in the memory 230.

The server controller 250 may identify whether necessary difference version information related to the vehicle 100 is present or not, based on the vehicle information and the difference version information related to the other vehicles 300 which are pre-stored, and when it is identified that the necessary difference version information is present, the server controller 250 may select the other vehicle 300 having the necessary difference version information. In the instant case, the server controller 250 may select the other vehicle 300 having the necessary difference version information with respect to a vehicle that recently parks, among the vehicles having an available parking space in the vicinity thereof, in consideration with the parking position information related to the other vehicles 300.

The server controller 250 may allow the communicator 240 to transmit the information and the available parking position information related to the selected other vehicle 300 to the vehicle 100.

When the vehicle 100 parks after receiving the necessary difference information from the other vehicle 300 based on the received information, the server controller 250 may receive the vehicle information, the difference version information, the parking time information, the parking position information related to the vehicle 100 and the information for the communication of the vehicle 100, and allow the memory 230 to store the corresponding information.

Hereinbefore the software upgrade system of the vehicle according to an exemplary embodiment has been described.

Hereinafter for convenience of description, a software upgrade method of a vehicle according to an exemplary embodiment will be described with reference to the accompanying drawings.

Figure 4:
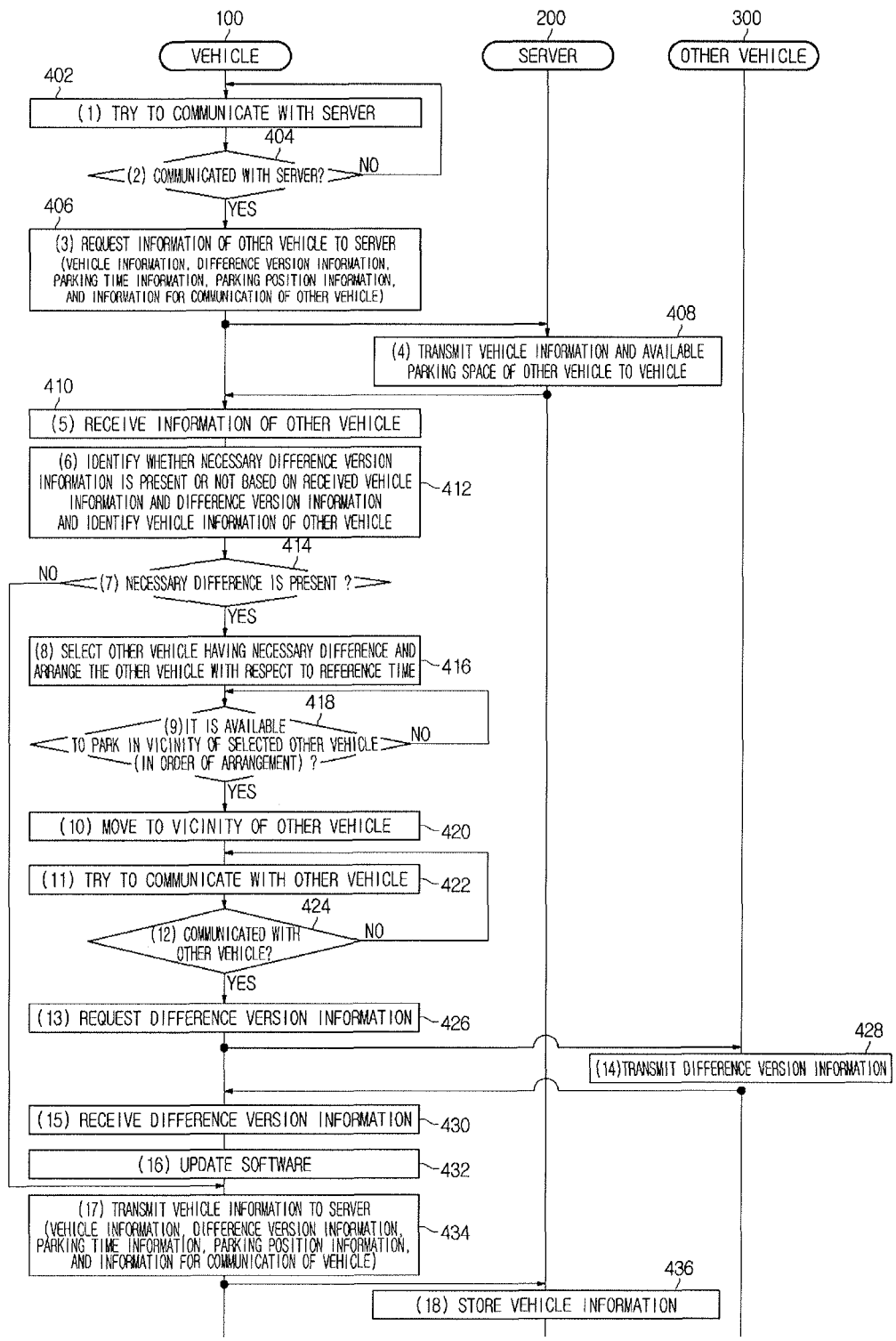
FIG. 4 is a flowchart illustrating a software upgrade method of the vehicle.
Figure 5:
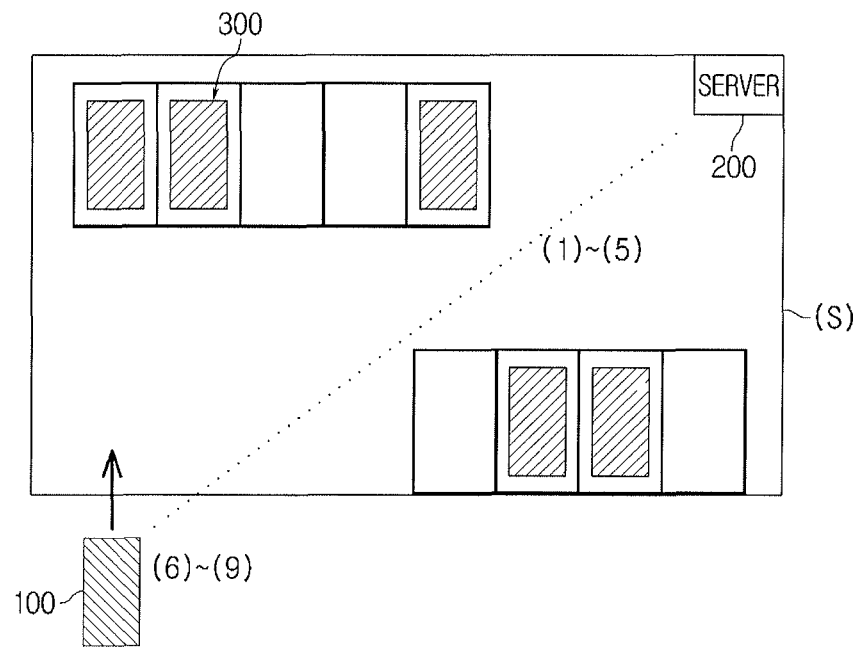
FIG. 5 is a view illustrating the software upgrade method of the vehicle according to FIG. 4.
Figure 5:
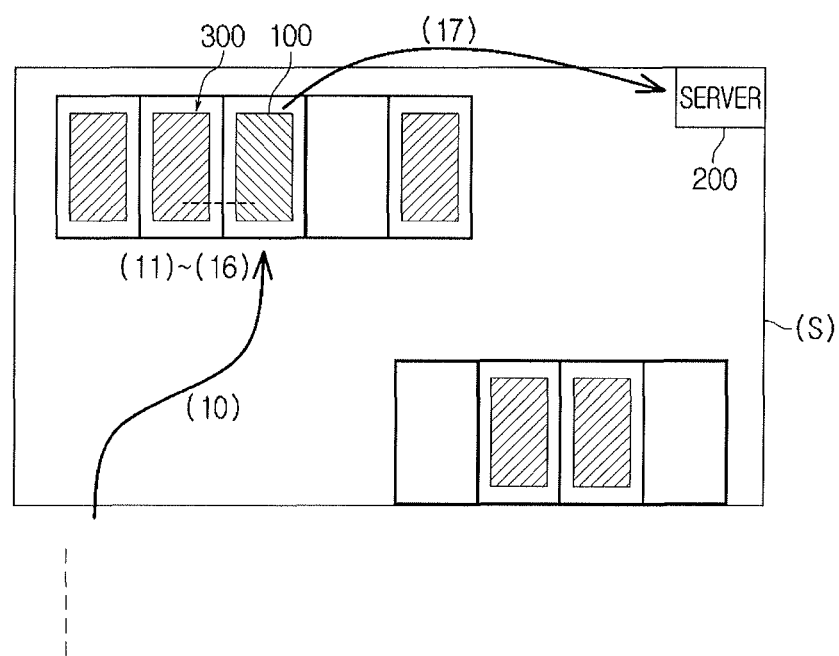

FIG. 4 is a flowchart illustrating a software upgrade method of the vehicle, FIG. 5 is a view illustrating the software upgrade method of the vehicle according to FIG. 4, and FIG. 6 is a table illustrating information exchanged between the server and the vehicle.

Referring to FIG. 4 and FIG. 5, when the vehicle 100 enters the certain space S, the vehicle 100 may try to communication with the server 200 (402).

The vehicle 100 may transmit a communication request signal to the server 200 through the communicator 140 and identify a communication connection with the server 200 (404).

When the vehicle 100 receives the communication connection signal from the server 200, the vehicle 100 may identify the communication connection with the server 200, and request information related to the other vehicle 300 to the server 200 through the communicator 140 (406). The information related to the other vehicle 300 may include vehicle information, difference version information, parking time information, parking position information related to the other vehicle 300 and information for the communication of the other vehicle 300.

The server 200 may transmit the information related to the other vehicle 300 in a response to a signal of the vehicle 100 for requesting the information related to the other vehicle 300 (408). FIG. 6 illustrates an example of information exchanged between the server 200 and the vehicle. However, the information exchanged between the server 200 and the vehicle illustrated in FIG. 6 is a merely example and thus the information exchanged between the server 200 and the vehicle is not limited thereto. For example, when the server 200 provides the parking management service, the server 200 may transmit information related to an available parking position, to the vehicle 100. An exemplary embodiment will be referred to as an example in which the server 200 provides the parking management service.

When receiving the vehicle information related to the other vehicle 300 from the server 200 (410), the vehicle 100 may identify whether necessary difference version information related to the vehicle 100 is present or not, based on the received vehicle information and difference version information related to the other vehicle 300, and identify vehicle information related to the other vehicle 300 having the necessary difference version information (412).

When it is identified that the necessary difference version information related to the vehicle 100 is not present, based on the vehicle information and difference version information related to the other vehicle 300 (414), the vehicle 100 may directly proceed with a step 434 which will be described later. In contrast, when it is identified that the necessary difference version information related to the vehicle 100 is present (414), the vehicle 100 may select the other vehicle 300 having the necessary difference version and arrange the other vehicles 300 with respect to a reference time (416).

The vehicle 100 may sequentially identify whether the vehicle 100 is allowed to park in the vicinity of the selected other vehicles 300 (418), and move to the vicinity the other vehicle 300, which is identified to have an available parking space in the vicinity thereof (420).

When the vehicle 100 tries to communicate with the other vehicle 300 (422) and the communication is connected to the other vehicle 300 (424), the vehicle 100 may request difference version information to the other vehicle 300 (426). The other vehicle 300 may transmit the difference version information to the vehicle 100 in a response to the request of the vehicle 100 (428).

The vehicle may upgrade the software based on the received difference version information upon receiving the difference version information from the other vehicle 300 (432, 432). For example, the vehicle may update difference version information related to map data. When the vehicle 100 tries to park in the vicinity of the other vehicle 300 and the parking is completed, the vehicle 100 may transmit the information related to the vehicle 100, to the server 200 (434). The information related to the vehicle transmitted to the server 200 may include vehicle information, difference version information, parking time information, parking position information and information for the communication.

The server 200 may store the information related to the vehicle 100 received from the vehicle 100, in the memory 230 (436) and the stored information may become the base to provide difference version information to other vehicle 300 entering the certain space S.

Hereinafter for convenience of description, a software upgrade method of a vehicle according to another exemplary embodiment will be described with reference to the accompanying drawings.

Figure 7:
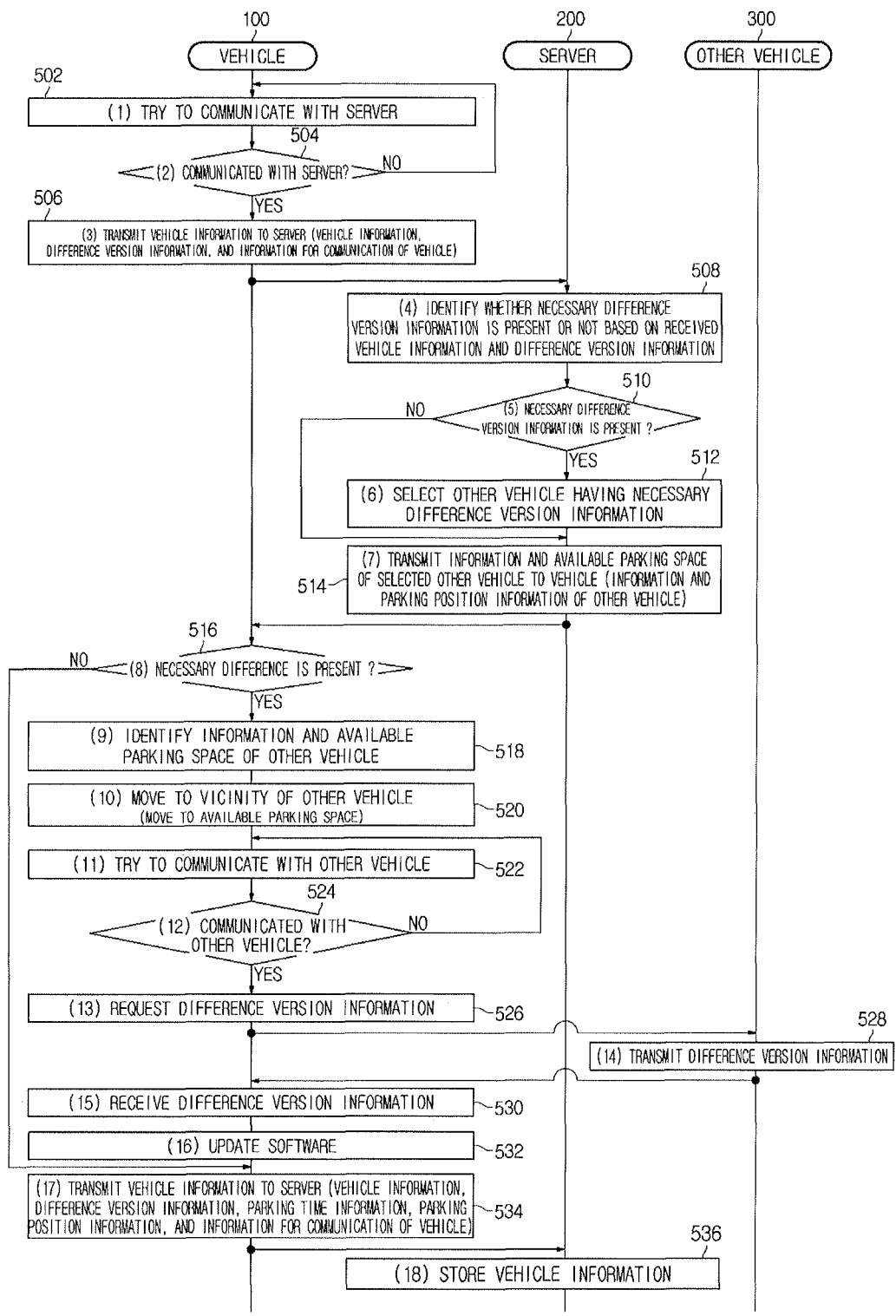
FIG. 7 is a flowchart illustrating a software upgrade method of a vehicle according to another exemplary embodiment of the present invention.
Figure 8:
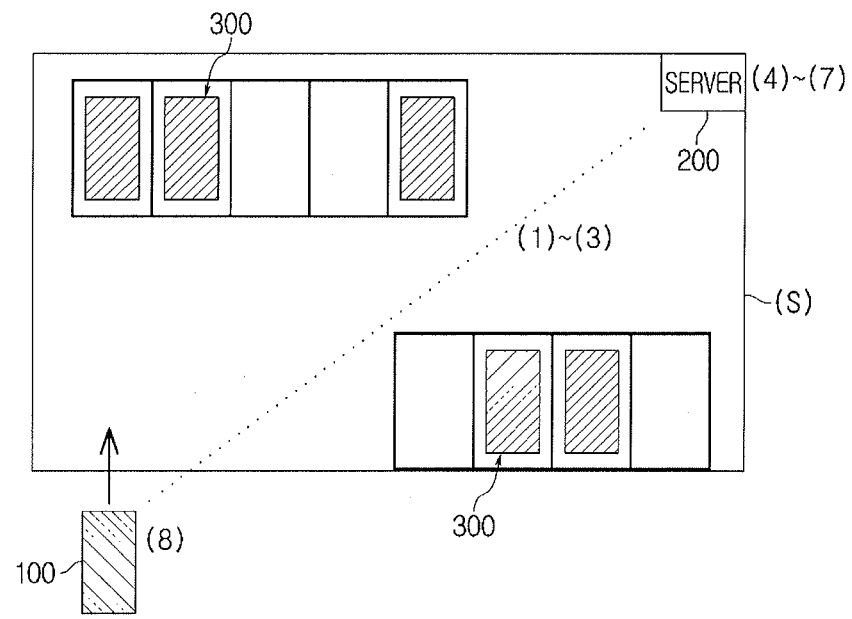
FIG. 8 is a view illustrating the software upgrade method of the vehicle according to FIG. 7.
Figure 8:
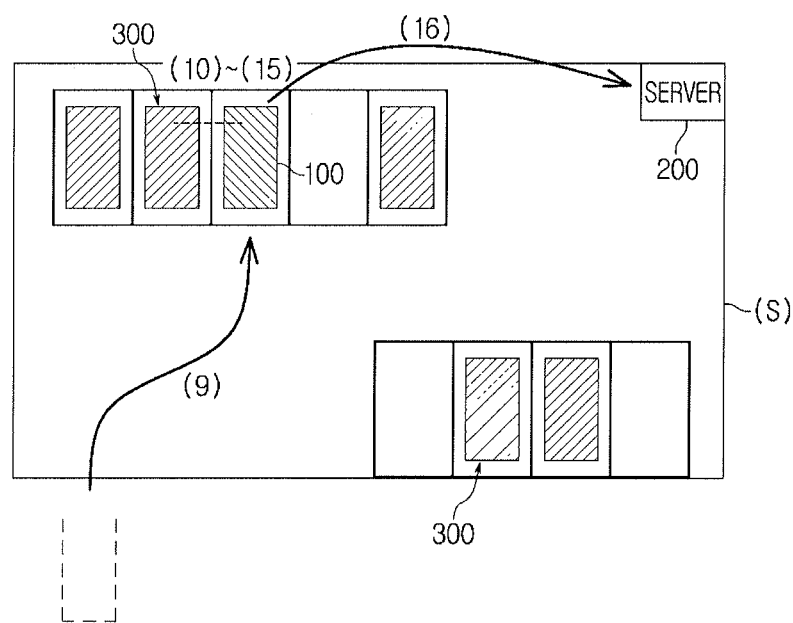

FIG. 7 is a flowchart illustrating a software upgrade method of a vehicle according to another exemplary embodiment of the present invention, and FIG. 8 is a view illustrating the software upgrade method of the vehicle according to FIG. 7.

Referring to FIGS. 7 and 8, when a vehicle 100 enters a certain space S, the vehicle 100 may try to communication with a server 200 (502).

The vehicle 100 may transmit a communication request signal to the server 200 through a communicator 140 and identify a communication connection with the server 200 (504).

When the vehicle 100 receives the communication connection signal from the server 200, the vehicle 100 may identify the communication connection with the server 200, and transmit information related to the vehicle 100 to the server 200 through the communicator 140 (506). The information related to the vehicle 100 may include vehicle information, difference version information and information for the communication.

The server 200 may identify whether necessary difference information is present or not, based on the vehicle information and difference version information received from the vehicle 100 (508, 510). In the memory 230 of the server 200, the vehicle information, difference version information, parking time information, parking position information related to the other vehicles 300 and information for the communication of the other vehicles 300 may be pre-stored. When receiving the information related to the vehicle 100 from the vehicle 100, the server 200 may obtain necessary difference version information related to the vehicle 100 based on the pre-stored information, and select the other vehicles 300 having the necessary difference version information.

When it is identified that necessary difference version information related to the vehicle 100 is present (510), the server 200 may select the other vehicles 300 having the necessary difference version information (512), and transmit the information and the available parking position information related to the selected other vehicle 300, to the vehicle 100 (514). The available parking position information may include information related to parking positions in the vicinity of the selected other vehicle 300, and a description thereof the same as or substantially the same as those shown in the above mentioned description will be omitted.

When it is identified that the necessary difference version information related to the vehicle 100 is not present, the server 200 may transmit a result of the identification, to the vehicle.

When it is identified that the necessary difference version information is present, based on the information received from the server 200 (516), the vehicle 100 may identify the information and the available parking position information related to the other vehicle 300 (518), and move to the vicinity the other vehicle 300 having the necessary difference information (520). The vicinity of the other vehicle 300 may include an idea of moving to an available parking position in the vicinity of the other vehicle 300.

In contrast, when it is identified that the necessary difference version information related to the vehicle 100 is not present, based on the information received from the server 200 (516), the vehicle 100 may directly proceed with a step 534.

After a step 520, when the vehicle 100 tries to communicate with the other vehicle 300 (522) and the communication is connected to the other vehicle 300 (524), the vehicle 100 may request difference version information to the other vehicle 300 (526). The other vehicle 300 may transmit the difference version information to the vehicle 100 in a response to the request of the vehicle 100 (528).

The vehicle may upgrade the software based on the received difference version information upon receiving the difference version information from the other vehicle 300 (530, 532). For example, the vehicle may update difference version information related to map data. When the vehicle 100 tries to park in the vicinity of the other vehicle 300 and the parking is completed, the vehicle 100 may transmit the information related to the vehicle 100, to the server 200 (534). The information related to the vehicle transmitted to the server 200 may include vehicle information, difference version information, parking time information, parking position information and information for the communication.

The server 200 may store the information related to the vehicle 100 received from the vehicle 100, in the memory 230 (536) and the stored information may become the base to provide difference version information to other vehicle 300 entering the certain space S.

Hereinbefore the software update method of the vehicle has been described. The technical idea of the present invention is not limited to the above-described examples, but the technical idea may include various concepts within a range that may be easily considered by a person skilled in the art.

For example, the present invention may provide a similar function even when the server 200 is not present in the certain space S.

For example, the vehicle 100 requiring the software update may transmit information related to the vehicle 100 to the vicinity thereof. The vehicle 100 may transmit the facts to other vehicles 300 in the vicinity of the vehicle 100 in a broadcast manner.

When receiving the information related to the vehicle 100 from the vehicle 100, the other vehicles 300 in the vicinity of the vehicle 100 may identify whether necessary difference version information, which is needed to update the software of the vehicle 100, is present or not in the other vehicle 300. When it is identified that the necessary difference version information, which is needed to update the software of the vehicle 100, is present, the other vehicle 300 may add the necessary difference version information to information related to the other vehicle 300 and transmit the information related to the other vehicle 300, to which the necessary difference version information is added, to the vicinity.

FIG. 9 is a table illustrating a case in which difference version information received from other vehicle is added in a relay manner.

Referring to FIG. 9, the vehicle 100 may first transmit first information in a broadcasting manner. Among the other vehicles 300 receiving the first information, other vehicle 300 having necessary difference version information needed for the vehicle 100, may generate second information by adding the necessary difference version information to the first information, and transmit the second information in the broadcasting manner.

The vehicle 100 may receive the second information and store the second information in the memory 130 of the vehicle 100. The vehicle 100 may transmit the second information again in the broadcasting manner, and receive difference version information provided in the other vehicles 300 located in the certain space S, by receiving $N_{th}$ information in the same manner.

The vehicle 100 may control an amount of processed information by deleting information exceeding a predetermined time period. Alternatively, the vehicle 100 may control an amount of processed information by preventing the overlapped information from being stored in the memory 130 when receiving information overlapped with stored information therein.

As is apparent from the above description, when the vehicle 100 enters the certain space S such as a parking lot, the vehicle 100 may perform a request broadcast about necessary difference version information in the above mentioned manner, and it may be possible to update the software of the vehicle 100 while allowing the vehicle 100 to perform automatic parking based on the received information.

Although a few embodiments of the present invention have been shown and described, it would be appreciated by those skilled in the art that changes may be made in these embodiments without departing from the principles and spirit of the disclosure, the scope of which is defined in the claims and their equivalents.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for updating software for a vehicle, the method comprising:
   receiving vehicle information and difference version information related to other vehicle from a server;
   identifying whether necessary difference version information is present based on the received difference version information and identifying vehicle information related to other vehicle having the necessary difference version information;
   receiving the necessary difference version information from the other vehicle having the necessary difference version information; and
   updating the software for the vehicle based on the received necessary difference version information,
   wherein the reception of the vehicle information and difference version information related to the other vehicle from the server includes:
   receiving the vehicle information, the difference version information, parking time information, and parking position information related to the other vehicle parking in a space, from the server, and
   when a plurality of other vehicles has the necessary difference version information, arranging the other vehicles with respect to a vehicle recently parking, based on the parking time information;

sequentially identifying whether an available parking space is present in a vicinity of the other vehicle, based on the parking position information and an arrangement order of the other vehicles; and receiving the necessary difference version information from the other vehicles while sequentially moving to the available parking space.

2. The method of claim 1, wherein, when a plurality of pieces of necessary difference version information is present and different other vehicles have the necessary difference version information, the reception of the necessary difference version information from the other vehicle having the necessary difference version information includes receiving first necessary difference version information from a first vehicle; and receiving second necessary difference version information from a second vehicle.

3. The method of claim 1, wherein in the reception of the vehicle information and difference version information related to other vehicle from the server, the difference version information includes difference version information related to software for the vehicle including at least one of map information, system software, firmware, and an application.

4. The method of claim 1, further including:

transmitting the received necessary difference version information and vehicle information related to the vehicle to the server.

5. The method of claim 1, further including:

transmitting vehicle information and difference version information related to a vehicle to the server; and receiving vehicle information related to other vehicle having the necessary difference version information related to the vehicle from the server.

6. The method of claim 5, further including:

receiving the vehicle information and difference version information related to the vehicle from the server and obtaining vehicle information related to other vehicle having the necessary difference version information related to the vehicle and transmitting the obtained information to the vehicle.

7. A vehicle comprising:

a communicator configured to receive vehicle information and difference version information related to other vehicle from a server; and a controller configured to identify whether necessary difference version information is present based on the received difference version information and configured to identify vehicle information related to the other vehicle having the necessary difference version information, and configured to allow software for the vehicle to be updated by receiving the necessary difference version information from the other vehicle having the necessary difference version information, wherein the communicator receives the vehicle information, the difference version information, parking time information, and parking position information related to the other vehicle parking in a space, from the server, and wherein, when a plurality of other vehicles has the necessary difference version information, the controller is configured to arrange the other vehicles with respect to a vehicle recently parking, based on the parking time information, sequentially identify whether an available parking space is present in a vicinity of the other vehicle, based on the parking position information and an arrangement order of the other vehicles, and receive the necessary difference version information from the other vehicles while sequentially moving to the available parking space.

8. The vehicle of claim 7, wherein, when a plurality of pieces of necessary difference version information is present and different other vehicles have the necessary difference version information, the controller is configured to allow the vehicle to receive first necessary difference version information from a first vehicle and to allow the vehicle to receive second necessary difference version information from a second vehicle.

9. The vehicle of claim 7, wherein the difference version information includes difference version information related to software for the vehicle including at least one of map information, system software, firmware, and an application.

10. The vehicle of claim 7, wherein the controller is configured to control the communicator so that the communicator transmits the received necessary difference version information and vehicle information related to the vehicle to the server.

11. The vehicle of claim 7, wherein the controller is configured to control the communicator so that the communicator transmits the vehicle information and difference version information related to the vehicle to the server and receives the vehicle information related to the other vehicle having the necessary difference version information related to the vehicle from the server.

* * * * *